Dec. 20, 1955 D. C. GERBER 2,727,262
INSULATED FLOOR POLISHERS
Filed Jan. 5, 1952 3 Sheets-Sheet 1

INVENTOR:
DALE C. GERBER
BY
*Richard P. Fitzsimmons*
ATTORNEY

Dec. 20, 1955  D. C. GERBER  2,727,262
INSULATED FLOOR POLISHERS
Filed Jan. 5, 1952  3 Sheets-Sheet 3

INVENTOR:
DALE C. GERBER
BY
*Richard P. Fitzsimmons*
ATTORNEY

United States Patent Office 2,727,262
Patented Dec. 20, 1955

2,727,262
INSULATED FLOOR POLISHERS

Dale C. Gerber, North Canton, Ohio, assignor to The Hoover Company, North Canton, Ohio, a corporation of Ohio Application January 5, 1952, Serial No. 265,115

16 Claims. (Cl. 15—49)

This invention relates to floor polishers and more particularly to floor polishers to be used in localities where high voltages only are available and in localities where governmental regulations require complete electrical insulation.

This application is a continuation-in-part of my prior application, Serial No. 183,618, filed September 7, 1950, now abandoned.

Specifically, according to the present invention, a bumper made of rubber or other electrical insulating material encircles the entire periphery of the polisher frame including a foot actuated switch actuator and guards therefor. The top of the frame is insulated by an appearance housing made of electrically insulating material and the pivoted handle is insulated by bushings of electrically insulating material extending into and substantially closing openings in the appearance hood. According to one modification of the invention the bumper is extended beneath the frame of the polisher so as to insulate the entire bottom of the frame except for openings for brush carrying shafts. According to a second modification of the invention a separate insulating plate is provided for insulating the bottom of the polisher frame and is held in place by the bumper. In both modifications the brush carrying shafts are electrically insulated by forming the brush attaching fittings of electrically insulating material having flanges which extend into and substantially close the openings in the bottom plate. In both modifications a louvered closure for the headlight and ventilating opening is completely insulated from the frame by the bumper, by the appearance housing and by a separate strut or brace made of electrically insulating material.

Other objects and advantages of this invention will become apparent as the description proceeds when taken in connection with the accompanying drawings in which.

The present invention is an improvement over an application for United States Letters Patent by Erhard O. Kohl, Serial No. 91,980, filed May 7, 1949, now Patent Number 2,683,884, dated July 20, 1954. The general arrangement and the motor cooling air circuit of the present polisher are substantially the same as in the above mentioned application and will not be described in detail in this application except as it pertains to the improvement of the present invention.

Figure 4:
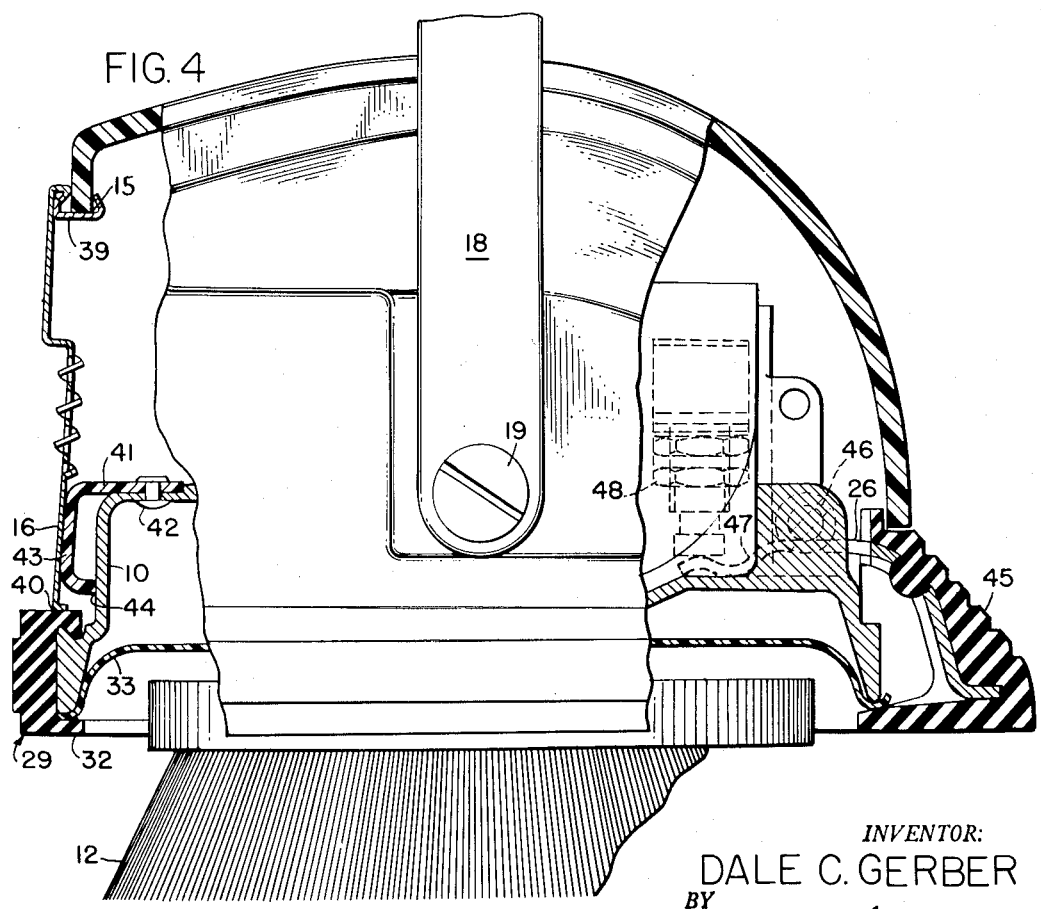
Figure 4 is a cross-sectional view showing features common to both modifications taken on line 4—4 of Fig. 3 looking in the direction of the arrows.

Referring to the drawings, the reference numeral 10 represents the main frame of a floor polisher carrying two vertical axis rotating brushes 11 and 12 detachably secured to the lower ends of rotating shafts 13 driven by a motor housed within the hood 14, which is made of electrically insulating material. The hood 14 is provided with a combined headlight and ventilating opening 15 closed by a louvered closure plate 16 (Fig. 4). A propelling handle having bails 17 and 18 is pivoted to the frame 10, one pivot pin being shown at 19. Each pivot pin is surrounded by a shouldered insulating bushing such as shown at 20. The bushings extend through and substantially close aligned openings 22 in the hood 14. The handle bails 17 and 18 pivot about the bushings 20 which are received in shouldered bores 21 in the lower ends of the bails.

Figure 1:
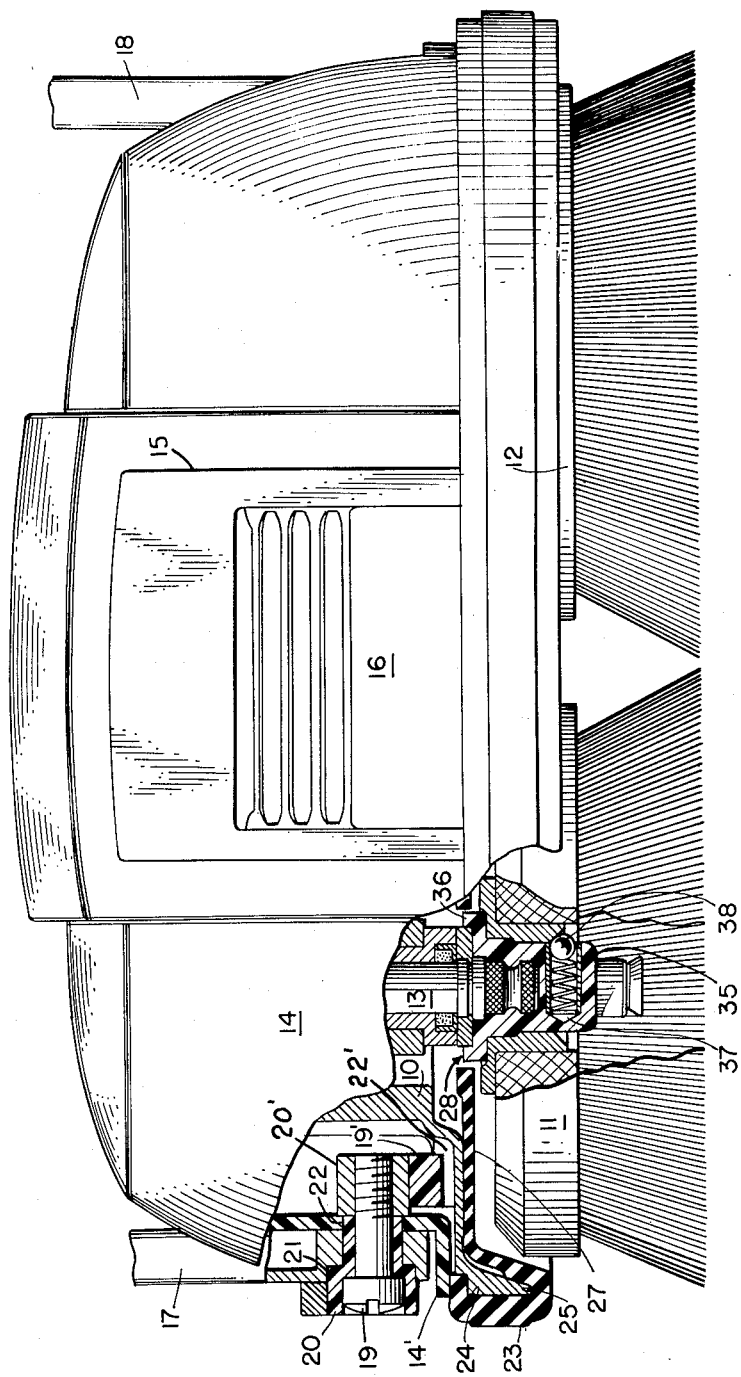
Figure 1 is a front view of a floor polisher, partly broken away to show how the present invention is applied thereto.

In the modification of Figure 1, the pivot pin 19 is screw threaded into an interiorly threaded bore in a metallic block 20' which is bonded to an insulating pad 19'. The pad 19' is also bonded to a metallic plate 22' which is secured to the frame 10 in any suitable manner to insulatingly support the handle on the frame 10.

In the modification of Fig. 1 a rubber bumper 23 having a channel 24 fits over the flange 25 of frame 10 and extends about the periphery thereof to the switch actuator 26 and extends thereover as will be explained hereinafter. In Fig. 1 the bumper 23 is extended inwardly at 27 so as to insulate the entire bottom of the frame 10 except for openings 28 through which the shafts 13 extend.

Figure 2:
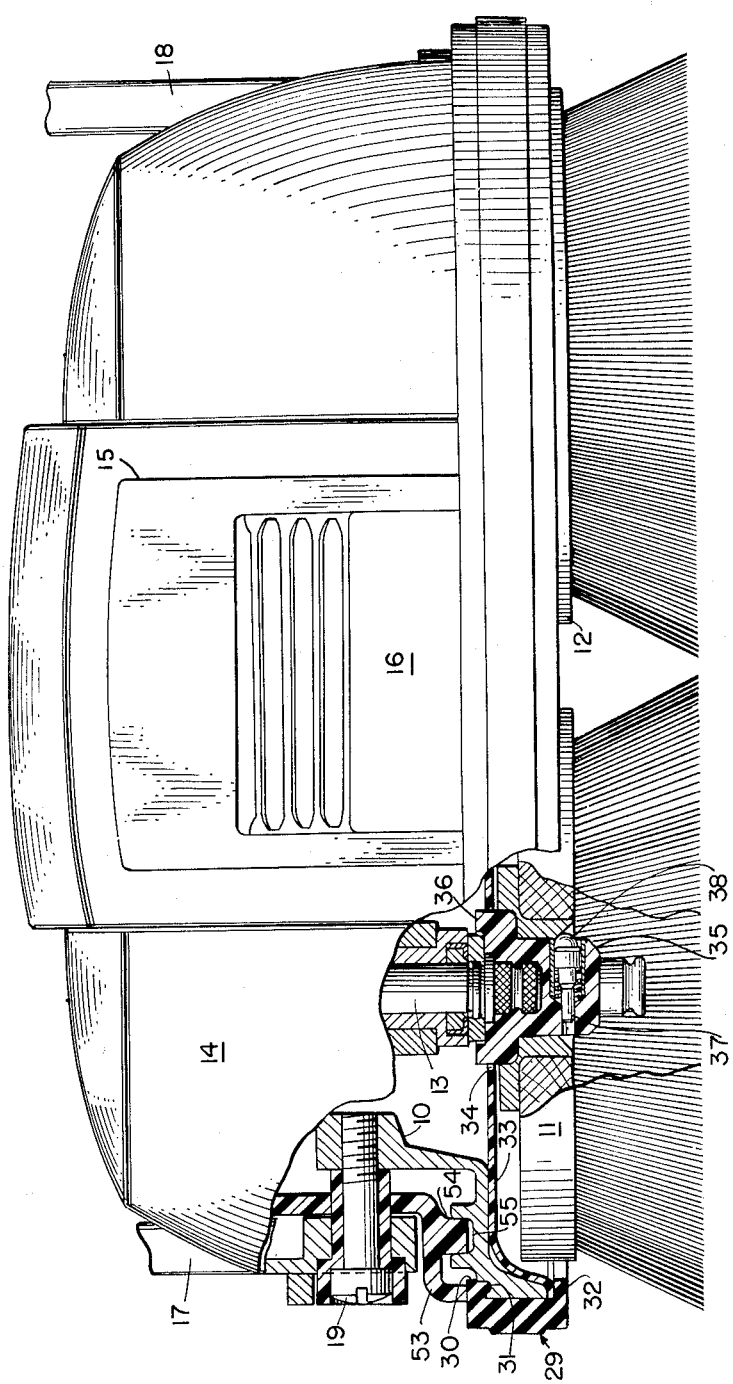
Figure 2 is a view similar to Fig. 1 of a modified form of the invention.

In the modification of Fig. 2 the bumper 29 has a rib 30 fitting into a peripheral groove 31 in the top edge of the frame 10 and a bottom ledge 32 supporting an insulating bottom plate 33 which covers the bottom of the frame 10 except for openings 34 through which the shafts 13 extend. In the modification of Fig. 1 the hood 14 is flanged at 14' to rest on top of the bumper 23.

In the modification of Fig. 2 the hood 14 has a peripheral downwardly extending rib 53 resting on the top of the bumper 29 and a rib 54 fitting in a groove 55 in the top of the frame 10.

Molded to the lower end of the shafts 13 are insulating members 35 having flanges 36 which extend upwardly into and substantially close the openings 28 or 34. The members 35 have bores 37 in which spring-pressed detents 38 are positioned to detachably hold the brushes 11 and 12 to the lower ends of the shafts 13. The members 35 may be of non-circular shape to fit similar non-circular openings in the brush backs or they may be otherwise drivingly connected to the brush backs.

As shown in Fig. 4 the louvered closure plate 16 is detachably connected to the upper edge of the opening 15 in hood 14 as shown at 39 and its lower edge rests against the top of the bumper 29 as shown at 40. A brace or strut 41 made of insulating material is attached to the frame 10 at 42, has a downward turned side 43 against which the louvered plate 16 abuts and an inturned flange 44 abutting against the frame 10.

Figure 3:
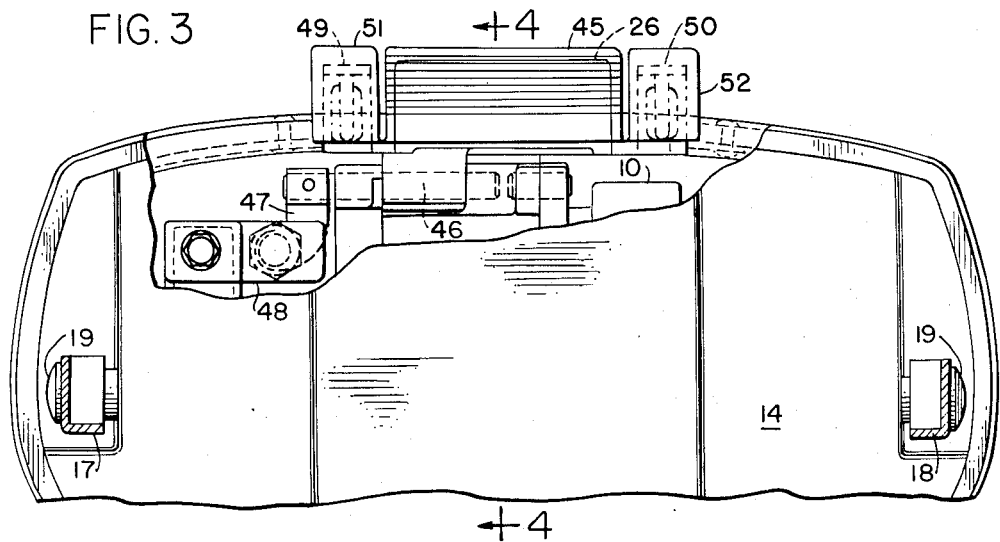
Figure 3 is a top plan view common to both modifications partly broken away to show the details of the foot switch mounting.

As shown in Figs. 3 and 4 the switch operator 26 is covered by a foot pedal 45 integral with the bumper guard 29, is pivoted to the frame 10 at 46 and has an extension 47 which cooperates with a push-push switch 48 suitably mounted on the frame 10 and connected in circuit with the driving motor and the headlight. The pedal 45 is secured to the actuator 26 by an integral rivet extending through an opening in the actuator 26 as shown in Fig. 4. The pedal 45 is protected from unintentional operation by guards 49 and 50 (Fig. 3) extending rearwardly from the frame 10 and covered with insulating material 51 and 52 also formed integrally with the bumper 29. As shown in Fig. 3 the material of the bumper 29 is separated between the pedal 45 and the insulations 51 and 52 so as to render the foot pedal 45 more easily actuatable.

From the foregoing it can be seen that the present invention provides a floor polisher which is completely electrically insulated so that it is impossible for the operator to touch any uninsulated part whether the brushes are on or off to thereby protect the operator against electric shocks in case a ground should occur in the electrical circuit.

While I have shown but two modifications of my invention it is to be understood that those modifications are to be taken as illustrative only and not in a limiting sense. I do not wish to be limited to the particular structure shown and described but to include all equivalent variations thereof except as limited by the scope of the claims.

I claim:

1. In a motor driven floor polisher, a metallic frame for supporting the working parts of the polisher including a pair of vertical axis shafts for detachably mounting a plurality of vertical axis polishing brushes, a bumper of electrically insulating material extending about the periphery of said frame, an appearance hood of electrically insulating material having its lower peripheral edge resting on top of said bumper and a bottom plate of electrically insulating material extending inwardly from the lower edge of said bumper and covering the bottom of said frame except for openings for the passage of said vertical axis shafts.

2. In a polisher according to claim 1 in which said bottom plate is formed integrally with said bumper.

3. In a polisher according to claim 1 in which said bumper has a ledge extending inwardly beneath the periphery of said frame and said bottom plate is supported on said ledge.

4. In a polisher according to claim 1 in which said shafts extend downwardly through said openings in said bottom plate and a brush coupling member attached to the lower end of each shaft by a member made of electrically insulating material in alignment with and substantially closing the openings in said bottom plate.

5. In a polisher according to claim 1 including a handle pivotally mounted on said frame by means of pivot pins extending through openings in said hood and an electrically insulating sleeve surrounding each pin and insulating said handle from said pins, said sleeves being in alignment with the openings in said hood and extending into the same and an electrically insulated mounting for each pin.

6. In a polisher according to claim 1 in which said hood is provided with a light emitting and ventilating opening, a louvered closure plate for said opening having one edge detachably secured to said hood at the top of said opening and its lower end resting on the top of said bumper and a bracing strut of electrically insulating material extending between said frame and closure plate.

7. In a polisher according to claim 1 including a switch for controlling the polisher and an actuator for said switch extending from the periphery of said frame, said bumper having a portion covering said actuator to electrically insulate the same.

8. In a polisher according to claim 7 including a guard on each side of said actuator and also covered by said bumper.

9. In a polisher according to claim 1 in which said bumper is of channel shape in cross section with the channel fitting over the edge of said frame, said hood resting on the top leg of the channel and said bottom plate being supported on the bottom leg of the channel.

10. In a polisher according to claim 1 in which said bumper has a flange extending over the top edge of said frame and said hood rests on said flange.

11. In a polisher according to claim 10 in which said frame has a groove in its upper surface adjacent its edge and said hood has a pair of downwardly extending ribs one resting on said flange and the other resting in said groove.

12. In a floor polisher, a metallic frame for supporting the working parts of the polisher, a pair of metallic vertical shafts rotatably carried by said frame, an electrically insulating bottom plate supported at the periphery of said frame and covering the bottom thereof except for openings in alignment with said shafts, a coupling of electrically insulating material molded to the lower end of each shaft and having a flange extending into and substantially closing the openings in said bottom plate.

13. In a floor polisher according to claim 12 including a bumper extending about the periphery of said frame and supporting said bottom plate.

14. In a floor polisher according to claim 13 in which said bumper is formed integrally with said bottom plate.

15. In a floor polisher, a metallic frame, a resilient bumper of electrically insulating material extending about the periphery of said frame, said bumper having a flange extending over the top of said frame, an appearance housing of electrically insulating material having its lower peripheral edge resting on said flange, a pair of opposed openings formed in said housing above its lower edge, pivot pins secured to said frame and extending through said openings, an electrically insulating sleeve surrounding each of said pins extending into and substantially closing said openings and a handle bail pivoted to said sleeves.

16. In a floor polisher according to claim 15 in which the securing means for said pivot pin includes a pad of electrically insulating material between each pin and said frame.

References Cited in the file of this patent

UNITED STATES PATENTS

| 1,915,495 | Eriksson-Jons | June 27, 1933 |
| 2,048,096 | Bisley | July 21, 1936 |
| 2,126,761 | Engberg | Aug. 16, 1938 |
| 2,184,446 | Snyder | Dec. 26, 1939 |
| 2,223,963 | Nadig | Dec. 3, 1940 |
| 2,327,229 | Vavrik et al. | Aug. 17, 1943 |
| 2,384,458 | Dubay | Sept. 11, 1945 |

FOREIGN PATENTS

| 659,062 | France | Jan. 29, 1929 |
| 450,248 | Great Britain | July 13, 1936 |
| 598,919 | Great Britain | Mar. 1, 1948 |

OTHER REFERENCES

Modern Plastics Publication, Oct., 1949, pages 81–82—Articles entitled "Vacuum Cleaners Use More Plastics."